United States Patent
Lucas et al.

(10) Patent No.: US 9,642,192 B2
(45) Date of Patent: May 2, 2017

(54) METHOD AND MANUFACTURING ASSEMBLY FOR SINTERING FUEL CELL ELECTRODES AND IMPREGNATING POROUS ELECTRODES WITH ELECTROLYTE POWDERS BY INDUCTION HEATING FOR MASS PRODUCTION

(75) Inventors: Thomas M. Lucas, Pleasant Valley, CT (US); Weizhong Zhu, Canton, CT (US); Thomas Vailionis, Litchfield, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 1015 days.

(21) Appl. No.: 13/198,600

(22) Filed: Aug. 4, 2011

(65) Prior Publication Data

US 2013/0032973 A1 Feb. 7, 2013

(51) Int. Cl.
*B23K 13/01* (2006.01)
*H05B 6/54* (2006.01)
(Continued)

(52) U.S. Cl.
CPC ............. *H05B 6/106* (2013.01); *C04B 35/64* (2013.01)

(58) Field of Classification Search
CPC ................. H01M 8/00; H01M 8/145; H01M 2300/0051; H01M 4/88; H01M 4/8825; H01M 4/8803–4/8896; H01M 8/14–8/148; H01M 2008/147; H01M 2300/051; H01M 8/12; H01M 8/1206–8/1273; H01M 2008/128; H01M 2008/1286; H01M 2008/1293; H01M 2300/0071–2300/008; Y02E 60/526; C01D 1/20; B29C 65/36; B29C 65/3656; H05B 6/106; C04B 35/64

USPC .... 219/603, 146.32, 146.41, 146.51, 146.52, 219/146.21, 146.22, 146.23, 146.3, 219/146.31, 604, 609, 610; 419/2, 61, (Continued)

(56) References Cited

U.S. PATENT DOCUMENTS 2,290,338 A * 7/1942 Koehring ....................... 219/603
3,352,951 A * 11/1967 Sara ............................... 264/671
(Continued)

FOREIGN PATENT DOCUMENTS

WO WO 2006082057 A2 * 8/2006 ............. H01M 4/88

OTHER PUBLICATIONS

International Search Report of International Application No. PCT/US2012/048449 issued on Feb. 28, 2013.

*Primary Examiner* — David Angwin
*Assistant Examiner* — Gyounghyun Bae
(74) *Attorney, Agent, or Firm* — Foley & Lardner LLP

(57) ABSTRACT

A method of manufacturing an electrode for a fuel cell, the method comprising forming a powder bed from a predetermined powder, sintering the powder bed at a first predetermined temperature to form a substrate, and in some embodiments subsequently distributing an electrolyte powder on a surface of the substrate, and impregnating the substrate with electrolyte by heating the substrate with the electrolyte powder thereon to a second predetermined temperature so as to melt and wick the electrolyte into the substrate, thereby forming the electrode for the fuel cell, wherein at least one of the sintering and impregnating is performed by applying induction heating to at least one of said powder bed and said substrate.

13 Claims, 8 Drawing Sheets

US 9,642,192 B2
Page 2

(51) Int. Cl.
  *B05D 5/12* (2006.01)
  *H01M 8/00* (2016.01)
  *H01M 4/02* (2006.01)
  *H05B 6/10* (2006.01)
  *C04B 35/64* (2006.01)

(58) Field of Classification Search
  USPC ...... 419/62, 65, 66, 6, 5, 7, 8, 9, 10, 30, 53, 419/54, 58; 429/400, 402, 403, 404, 405, 429/406, 416, 417, 418, 479, 480, 481, 429/482, 483, 484, 485, 486, 535, 429/523–529; 75/623.5, 10.14, 10.18, 75/10.2, 10.25, 10.1, 10.11, 10.12, 383, 75/746, 751, 758, 761, 763, 765, 769, 75/770; 29/623.5; 427/115
  IPC ............... H05B 6/06; B05C 11/00,9/08; B29C 59/16; H01M 4/8885, 8/12, 8/02, 4/90, 4/88, 4/86
  See application file for complete search history.

(56) References Cited

U.S. PATENT DOCUMENTS

| | | | | |
|---|---|---|---|---|
| 3,364,019 A * | 1/1968 | Houghtby et al. | ............ | 419/2 |
| 3,471,287 A * | 10/1969 | Roberts, Jr. | ............ | 419/2 |
| 3,471,336 A * | 10/1969 | Sturm | ............ | C25B 9/00 |
| | | | | 156/151 |
| 3,658,597 A * | 4/1972 | Gray | ............ | 419/19 |
| 3,738,828 A * | 6/1973 | Kiyoshi | ............ | 419/30 |
| 3,779,812 A * | 12/1973 | Witherspoon | ...... | H01M 4/8885 |
| | | | | 427/115 |
| 3,951,689 A * | 4/1976 | Ludwig | ............ | 429/402 |
| 4,242,426 A * | 12/1980 | Arendt | ............ | 429/304 |
| 4,369,104 A * | 1/1983 | Beckley | ............ | 204/290.06 |
| 4,555,453 A * | 11/1985 | Appleby | ............ | H01M 4/9041 |
| | | | | 29/623.5 |
| 4,597,170 A * | 7/1986 | Isenberg | ............ | H01M 8/1213 |
| | | | | 29/623.1 |
| 4,686,113 A | 8/1987 | Delfino et al. | | |
| 4,702,971 A * | 10/1987 | Isenberg | ............ | C25B 9/08 |
| | | | | 429/482 |
| 4,710,436 A * | 12/1987 | Nakamura | ...... | H01M 8/0295 |
| | | | | 29/623.5 |
| 4,812,329 A * | 3/1989 | Isenberg | ............ | C25B 9/08 |
| | | | | 427/115 |
| 4,847,172 A * | 7/1989 | Maskalick | ............ | C25B 9/08 |
| | | | | 429/480 |
| 4,948,680 A * | 8/1990 | Madou | ............ | B01J 23/002 |
| | | | | 252/62.2 |
| 5,021,304 A * | 6/1991 | Ruka | ............ | H01M 8/1213 |
| | | | | 427/115 |
| 5,069,987 A * | 12/1991 | Gordon | ............ | B01D 53/326 |
| | | | | 429/465 |
| 5,312,580 A * | 5/1994 | Erickson et al. | ............ | 419/2 |
| 5,415,833 A * | 5/1995 | Kweon et al. | ............ | 419/58 |
| 5,530,227 A * | 6/1996 | Matsen et al. | ............ | 219/633 |
| 5,640,669 A | 6/1997 | Harada et al. | | |
| 5,958,273 A * | 9/1999 | Koch et al. | ............ | 219/651 |
| 6,566,635 B1 * | 5/2003 | Matsen et al. | ............ | 219/633 |
| 6,593,017 B1 * | 7/2003 | Tan et al. | ............ | 429/421 |
| 6,884,976 B2 * | 4/2005 | Matsen et al. | ............ | 219/634 |
| 6,893,481 B2 * | 5/2005 | Nam et al. | ............ | 75/351 |
| 6,984,467 B2 * | 1/2006 | Schmidt | ............ | H01M 4/8621 |
| | | | | 429/488 |
| 8,211,587 B2 * | 7/2012 | Ruka | ............ | C23C 4/02 |
| | | | | 429/482 |
| 2003/0003348 A1 * | 1/2003 | Hanket | ............ | 429/44 |
| 2003/0111461 A1 * | 6/2003 | Morrison | ............ | 219/661 |
| 2003/0148164 A1 * | 8/2003 | Koch et al. | ............ | 429/34 |
| 2004/0166380 A1 * | 8/2004 | Gorte et al. | ............ | 429/12 |
| 2006/0057451 A1 * | 3/2006 | Okuzaki | ............ | C08J 3/075 |
| | | | | 524/379 |
| 2006/0113034 A1 * | 6/2006 | Seabaugh et al. | ............ | 156/308.2 |
| 2006/0134496 A1 * | 6/2006 | Won | ............ | C23C 16/24 |
| | | | | 429/518 |
| 2006/0163066 A1 * | 7/2006 | Hilchenko | ............ | H01M 4/8878 |
| | | | | 204/450 |
| 2006/0196418 A1 * | 9/2006 | Lindfors | ............ | C23C 16/45525 |
| | | | | 118/715 |
| 2008/0090127 A1 * | 4/2008 | Gorte et al. | ............ | 429/30 |
| 2008/0118635 A1 * | 5/2008 | Larsen | ............ | 427/115 |
| 2008/0157419 A1 * | 7/2008 | Ryu | ............ | B22F 3/1039 |
| | | | | 264/104 |
| 2009/0226781 A1 * | 9/2009 | Devoe | ............ | H01M 8/0215 |
| | | | | 429/486 |
| 2009/0243147 A1 * | 10/2009 | Iino et al. | ............ | 264/250 |
| 2010/0009091 A1 * | 1/2010 | Lu | ............ | H01M 4/8828 |
| | | | | 427/448 |
| 2010/0062312 A1 * | 3/2010 | Larsen et al. | ............ | 429/33 |
| 2010/0129693 A1 * | 5/2010 | Nguyen | ............ | H01M 4/8621 |
| | | | | 429/488 |
| 2010/0159365 A1 * | 6/2010 | Nakanishi | ............ | H01M 4/8605 |
| | | | | 429/527 |
| 2010/0196778 A1 * | 8/2010 | Youn et al. | ............ | 429/478 |

\* cited by examiner

METHOD AND MANUFACTURING ASSEMBLY FOR SINTERING FUEL CELL ELECTRODES AND IMPREGNATING POROUS ELECTRODES WITH ELECTROLYTE POWDERS BY INDUCTION HEATING FOR MASS PRODUCTION

FIELD OF THE INVENTION

Generally, this invention relates to fuel cells. More particularly, this invention relates to an electrode used in the fuel cells, a manufacturing method and a manufacturing system, and a fuel cell including such electrodes.

BACKGROUND OF THE INVENTION

A fuel cell is a device that directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each pair of the cells. The design of the supporting structure of the fuel cells and materials used for the electrolyte determine the type and performance of the fuel cell system.

A molten carbonate fuel cell (MCFC) operates by passing a reactant fuel gas through the anode, while oxidizing gas is passed through the cathode. A typical MCFC includes a porous nickel (Ni) anode that has been stabilized with metal alloy additives, and a porous, in situ oxidized nickel (Ni) or nickel oxide (NiO) cathode, separated from the anode by a porous matrix with alkali electrolyte. MCFCs operate on fuel and oxidant gas, typically at temperatures of about 650° C.

The operating life and performance of the MCFCs depends in part on the characteristics of the anode and cathode employed in the fuel cell. Although higher operating temperatures of MCFCs enable higher overall fuel cell system efficiency and greater flexibility in the use of available fuels, higher temperatures also place severe demands on corrosion stability and life of fuel cell components. For example, MCFC cathodes need to have excellent conductivity, high mechanical strength and durability, and low dissolution rate.

During manufacturing of MCFC cathodes, a Ni cathode electrode is typically sintered and impregnated with electrolyte at temperatures above 500° C. Microwave heating and electric- or gas-fired furnaces have been used for heating the work piece so as to achieve these temperatures and to melt the electrolyte. However, microwave heating, a gas furnace, or an electric furnace are not well suited for rapidly heating large work pieces or for ensuring a uniform temperature distribution within the work piece, which reduces the quality of the resulting work piece. Further, usage of the microwave heating and gas or electric furnaces results in significant operating costs caused by the use of electricity or gas, a large floor space required due to the size of the equipment, and equipment maintenance costs.

SUMMARY OF THE INVENTION

The present invention provides for an electrode manufacturing process that ensures rapid heating of a work piece and uniform temperature distribution within the piece and improves uniformity of the heating and cooling rates during the electrode manufacturing. The present invention provides for an electrode manufacturing process that reduces consumption of electrical energy, nitrogen gas, and natural gas, and reduces floor space and equipment maintenance costs. Moreover, the present invention provides for an electrode manufacturing method that reduces the processing time required to generate an electrode work piece.

One or more of these advantages are realized in a method of manufacturing an electrolyte impregnated electrode for a fuel cell, the method comprising: forming a powder bed from a predetermined powder, sintering the powder bed at a first predetermined temperature to form a electrode substrate, distributing an electrolyte powder on a surface of the electrode substrate, and impregnating the electrode substrate with electrolyte by heating the electrode substrate with the electrolyte powder thereon to a second predetermined temperature so as to melt and wick the electrolyte into the substrate, thereby forming the electrode for the fuel cell, wherein at least one of the sintering and impregnating is performed by applying induction heating to at least one of said powder bed and said electrode substrate. The induction heating is applied by an induction heating system including at least one coil and at least one susceptor. The at least one susceptor supports the at least one of the powder bed and the electrode substrate and conducts heat to said at least one of the powder bed and the electrode substrate. The at least one coil may be a multi-turn coil or a pair of coils surrounding the substrate, such as a multi-turn coil with an oval cross-section or a pair of flat coils. In certain embodiments, the at least one susceptor is one of: a graphite plate, an aluminum nitride plate, a silicon carbide plate, a boron carbide plate, or a cemented carbide plate. The electrode formed using the above method can be a cathode electrode or an anode electrode.

In certain embodiments, the induction heating system comprises a pair of flat coils and a pair of susceptors, and applying induction heating to the at least one of the powder bed and the electrode substrate comprises disposing the powder bed or the electrode substrate between the pair of susceptors and disposing the susceptors between the coils, and supplying alternating current of a predetermined frequency to the coils for a predetermined time period. In some embodiments, temperature in the induction heating system generated by the coils is monitored, and the frequency of the alternating current supplied to the coils is adjusted if the temperature is outside a predetermined range. The predetermined frequency is between 50 kHz and 500 kHz.

In some embodiments, the induction heating system comprises a multi-turn coil with an oval cross-section and a pair of susceptors. In such embodiments, the powder bed or the substrate is disposed between the pair of susceptors, the susceptors with the powder bed or the substrate are conveyed through the oval opening in the multi-turn coil while supplying an alternating current of a predetermined frequency to the multi-turn coil so as to maintain a temperature within the induction heating system within a predetermined temperature range.

In some embodiments, a nitrogen-based atmosphere and/or a thermally insulated environment are provided while applying induction heating. In some embodiments, one or more ceramic members are provided between the at least one susceptor and the powder bed or the substrate so as to prevent direct contact between them.

In certain embodiments, the electrode is a cathode electrode and the predetermined powder that forms the cathode electrode comprises one of nickel powder, nickel-based powder, copper powder, copper-based powder, cobalt powder, and cobalt-based powder, or any other powder for forming a cathode electrode. In particular, the first predetermined temperature is between 750 and 950 degrees C. and the second predetermined temperature is at least 500 degrees C. and typically between 550 and 700 degrees C.

When sintering of the powder bed is performed by applying heating to the powder bed, the powder bed may be formed in a recess in a first susceptor of the induction heating system and a second susceptor is provided in a spaced relationship relative to the first susceptor and the powder bed, and the induction heating is applied to the powder bed using either a pair of flat coils or a multi-turn coil with an oval cross-section. In some embodiments, the induction heating is applied by disposing the first and second susceptors with the powder bed formed in the first susceptor between first and second flat coils, and supplying alternating current of a predetermined frequency to the first and second coils for a predetermined time period. In other embodiments, the induction heating is applied by conveying the first and second susceptors with the powder bed formed in the first susceptor through the multi-turn coil surrounding the substrate while supplying an alternating current of a predetermined frequency to the multi-turn coil.

In some embodiments, the electrode may be cooled after sintering and/or after impregnating the electrode with electrolyte. During cooling, at least one susceptor supporting the electrode is contacted with one or more cooled or chilled plates or with the induction coils which provide cooling in a cooling transfer method.

A manufacturing assembly for manufacturing an electrolyte impregnated electrode for a fuel cell is also described. The manufacturing assembly includes an induction heating system comprising: at least one susceptor for supporting an electrode member to be heated, the electrode member comprising one of an electrode powder bed and an electrode substrate, and conducting heat to the electrode member, and at least one coil receiving an alternating current and comprising one or more coils surrounding the susceptor supporting the electrode member. The one or more coils may be a multi-turn coil with an oval cross-section or a pair of flat coils. The induction heating system provides induction heating during at least one of sintering the electrode member powder bed and impregnating the electrode substrate with electrolyte, while the electrode member is supported by the at least one susceptor. The assembly, in some embodiments, also includes a controller for controlling the induction heating system by adjusting frequency of the alternating current supplied to the at least one coil so that the sintering of the electrode powder bed is performed at a first predetermined temperature and the impregnating of the electrode substrate is performed at a second predetermined temperature. At least one temperature sensor may be provided in the assembly for sensing temperature in the induction heating system. In such embodiments, the controller adjusts the frequency of the alternating current supplied to the at least one coil based on the temperature sensed by the at least one temperature sensor. The manufacturing assembly, in some embodiments, also comprises a cooling assembly that includes one or more cooling or chilled elements for cooling the at least one susceptor and the electrode member after induction heating by the induction heating system is completed. In some embodiments, the one or more cooling or chilled elements comprise cooling or chilled plates, while in other embodiments, the one or more cooling or chilled elements comprise the one or more coils used during induction heating and cooled after the induction heating is completed. In certain embodiments, the induction heating system is housed in a heating chamber, while the cooling assembly is housed in a cooling chamber and the controller controls the operations of the induction heating system and of the cooling assembly.

BRIEF DESCRIPTION OF THE DRAWINGS

The above and other features and aspects of the present invention will become more apparent upon reading the following detailed description of illustrative embodiments thereof, in conjunction with the accompanying drawings, in which.

DETAILED DESCRIPTION

The present invention pertains to various embodiments of a method and a system for manufacturing electrodes for various fuel cell assemblies. As described below in greater detail, some embodiments provide for a method and a system for manufacturing an electrode for a fuel cell that use induction heating to impregnate a nickel-based work piece with electrolyte to form an electrode of desired characteristics. In some embodiments, the method and system also use the induction heating to sinter electrode powder into the freestanding work piece prior to impregnating the work piece with the electrolyte. Further, in some embodiments, the method and system also provide for cooling of the impregnated electrode using a chilled plate or a cooling member, and conducting the sintering and impregnating in a controlled atmosphere.

The techniques and methodologies disclosed hereinafter provide multiple advantages over the present state of art. In particular, various embodiments of the system and method disclosed herein ensure rapid heating of the work piece, uniform temperature distribution within the work piece during heating, and improve uniformity of the heating and cooling rates during the cathode manufacturing process, thereby enabling production of higher quality lower cost electrodes, and particularly cathodes, for fuel cells. Further, the embodiments described below reduce consumption of electrical energy, nitrogen gas, and natural gas, the required floor space, and equipment maintenance costs associated with the cathode manufacturing processes.

Figure 1:
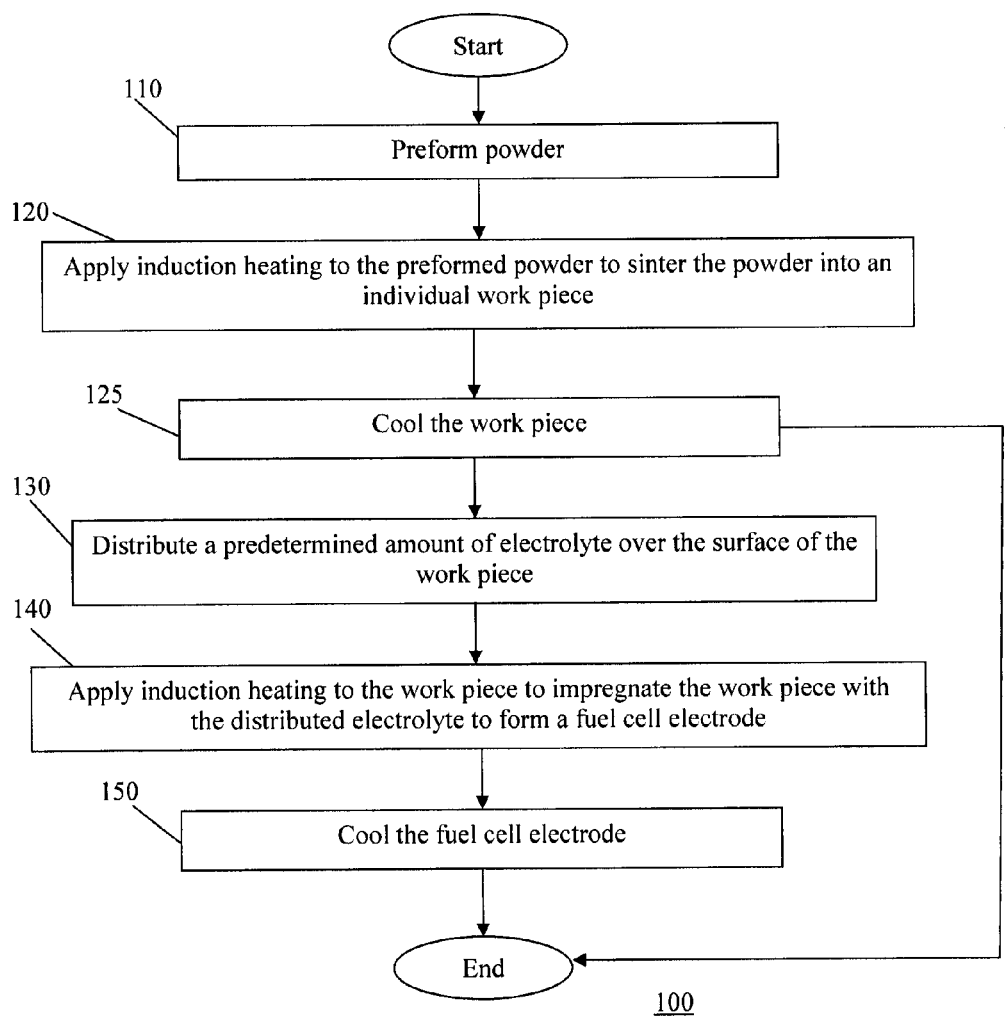
FIG. 1 shows a flow diagram of a method for manufacturing an electrode for a fuel cell.

FIG. 1 illustrates a method 100 for manufacturing an electrode for a fuel cell, in accordance with one illustrative embodiment of the invention. Although the method 100 of FIG. 1 shows the steps for manufacturing a cathode electrode, it is understood that the steps of a method of manufacturing an anode electrode, using materials and/or powders suitable for the anode electrode, are similar and/or substantially the same as the steps of the method in FIG. 1. Accordingly, the description of a corresponding method of manufacturing an anode electrode is omitted.

In a first step 110 of the method 100, predetermined cathode powder is provided and preformed into a predetermined shape, which corresponds to the approximate shape of the cathode electrode being manufactured. In the illustrative embodiments described herein, the predetermined cathode powder includes nickel-based powder, such as nickel (Ni) only or nickel (Ni) with one or more metal alloy additives. However, it is understood that the use of Ni powder or Ni-based powder is only illustrative and that the cathode electrode may be formed from other materials suitable for use in cathode electrodes, such as copper or copper-based powder or cobalt or cobalt-based powder. In the first step 110, a powder bed (e.g., a mold, a container, free standing form, or the like) is filled in with the Ni-based or other suitable powder having desired characteristics. The dimensions and shape of the free standing powder bed forming tools or of the hollowed-out space of the powder bed generally correspond to and determine the dimensions and shape of the cathode for the fuel cell. Cathodes may vary in their shapes (square, rectangular, and the like) and dimensions (12"×12", 51"×31", 50"×28", and the like) depending on a particular fuel cell assembly for which a cathode is being manufactured and the intended use of the fuel cell assembly. For example, a cathode may have a flat rectangular plate-like shape. Furthermore, the fuel cell assembly and its intended use also define required characteristics of the cathode, such as its porosity and composition, which in turn, define characteristics of the powder used in step 110 and the temperature required in step 120 or 140.

After the cathode powder is preformed to a desired shape and size, the method 100 proceeds to the second step 120. In step 120, heating is applied to the preformed cathode powder to sinter the cathode powder so as to form an individual cathode work piece or substrate. In the present embodiment, the heating is applied in step 120 so that the power bed is sintered at a predetermined temperature which is in a range of 750 and 950 degrees C. In one illustrative embodiment, the heating in step 120 is induction heating and the induction heating is applied to the powder bed using an induction heating system, such as a system 200 shown in FIG. 2.

Figure 2:
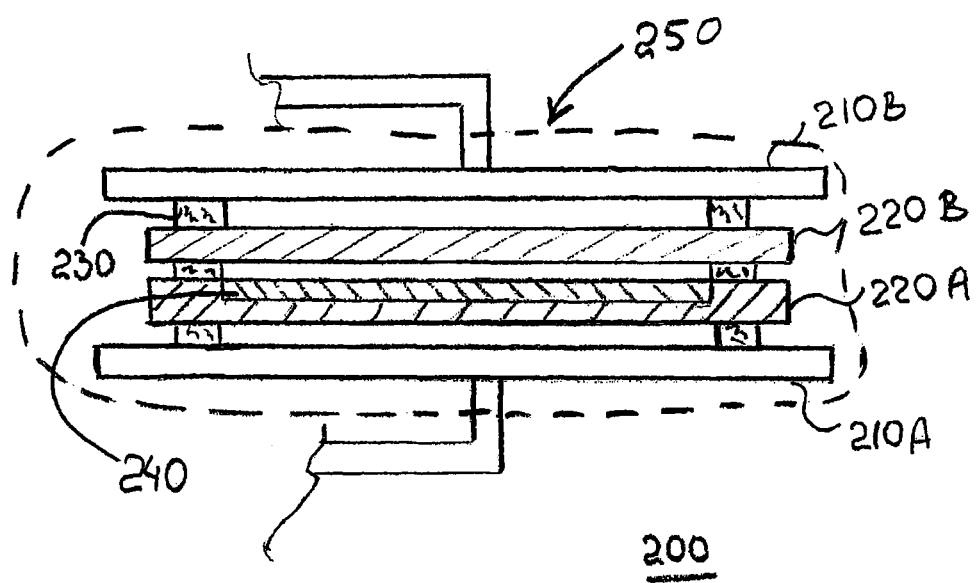
FIG. 2 shows an induction heating system for sintering the electrode.

Referring now to FIG. 2, the induction heating system 200 includes a pair of flat coils 210A and 210B (discussed in greater detail below with respect to FIG. 4), a pair of susceptors 220A and 220B, and one or more ceramic members 230, such as ceramic bars. The coils 210A and 210B act as a primary transformer to which AC current of a predetermined frequency is supplied from an RF power supply to create a magnetic field between the coils 210A and 210B. When an object to be heated, such as the electrode and/or the susceptor plate, enters into the magnetic field created between the coils 210A and 210B, a circulating current (Eddy current) is induced within the body of the object. As the current flows against the electrical resistance of the body of the object, precise and localized heat is generated without the direct contact between the body of the object and the coils.

In one illustrative embodiment, the susceptors 220A and 220B are placed between the coils 210A and 210B in order to improve the heating efficiency of the induction heating system 200, according to one embodiment. The preformed cathode or anode powder bed, is then placed between the susceptors 220A and 220B so that the heat generated within the susceptors 220A and 220B during induction heating is transferred to the object. In some embodiments, each of the susceptors 220 is a flat plate made from a thermally conducting material(s). Examples of such materials include, but are not limited to, are graphite, aluminum nitride, silicon carbide, boron carbide, cemented carbide, and the like. Generally, the shape of the susceptors 220 corresponds to the shape of the coils 210 and to the shape of the preformed cathode or anode powder. In some embodiments, the sizes of the susceptors 220, coils 210, and the preformed cathode or anode powder are substantially the same, while in other embodiments, their sizes differ. For example, in one embodiment, the size of the susceptors 220A and 220B may be smaller than the size of the respective coils 210A and 210B but larger than the size of the preformed powder to be placed between the susceptors 220A and 220B for heating. Susceptors may be ½ inch to 5 inches bigger or smaller than the coil(s).

To prevent direct contact between the coils 210A and 210B and the susceptors 220A and 220B, respectively, in some embodiments, one or more electrically non-conductive or ceramic members 230 are used. In the illustrative embodiment of FIG. 2, bar-shaped ceramic members are used. However, it is understood that the shape of the ceramic members may be varied. In addition, the size and positioning of the ceramic members 230 and the number of the ceramic members 230 used in the induction heating system 200 may be varied depending on the requirements of the system and of the shape and size of the pre-formed powder. For example, in the embodiment shown in FIG. 2, two ceramic bars 230 are placed between the susceptor 220A and the adjacent coil 210A and two ceramic bars 230 are placed between the other susceptor 220B and its adjacent coil 210B.

In the illustrative embodiment of FIG. 2, one of the susceptors 220, i.e., the lower susceptor 220A, may also serve as a powder bed form for the cathode or anode powder 240. As shown in FIG. 2, the second susceptor 220B is raised above the first susceptor 220A, using the ceramic bars 230 to prevent direct contact between the susceptor 220B and the preformed powder placed on the susceptor 220A. In addition, a controller (not shown) may be used to control induction heating of the powder bed and the temperature to which the powder bed is heated.

As discussed above, Ni or Ni-based powder may be used for forming the powder bed for the electrode. Because Ni is a magnetic material, additional heat is produced within the Ni-based powder through magnetic hysteresis, i.e., an internal friction created when magnetic parts pass through an inductor. In particular, magnetic materials offer electrical resistance to the rapidly changing magnetic fields within the inductor, and this resistance produces internal friction, which in turn produces heat. In order to further improve efficiency of sintering Ni by induction heating, in one embodiment, the induction heating is controlled by the controller.

Although, as shown in FIG. 2, the powder bed is formed by one of the susceptors, in other embodiments, the powder bed is formed separately from the susceptors. Further, although in the illustrative embodiment shown in FIG. 2, the susceptor 220B is not in direct contact with the powder bed, in other embodiments, the arrangement of the susceptors 220A and B may be varied depending on the requirements of the system and of the resulting cathode or anode electrode. For example, in some embodiments, the powder bed may be separated from one or both of the susceptors, for example, by one or more of the ceramic bars 230, or may be in direct contact with both of the susceptors 220A, 220B. Also, although in the illustrative embodiment of FIG. 2 the induction heating system 200 includes two susceptors 220A, 220B, the number of susceptors that can be used to sinter the powder material into an individual work piece or substrate may vary. For example, the induction heating system 200 may include no susceptors, one susceptor, two susceptors, three susceptors, and so on, depending on the requirements of the system and of the cathode or anode electrode being manufactured.

In the induction heating system 200, the frequency of the alternating current in the coils that induces Eddy currents inside the susceptors 220A and 220B may be varied depending on the size and requirements of the system and is generally within a wide radio frequency range of 100-400 kHz. The particular frequency of alternating current depends on various characteristics of: a particular induction heating system 200 (such as the thickness of the susceptors, the type of the susceptor material, or the like), the powder used, including the thickness and porosity of the preformed powder and the like, and the final work piece desired characteristics, such its porosity, void volume, and the like. In general, the frequency of the alternating current is selected such that the thinner the susceptor and the greater its thermal conductivity, the higher the selected frequency.

Further, the frequency of alternating current may be controlled by the controller and may be adjusted with time in accordance with the temperature detected within the induction heating system. In particular, in some embodiments, the temperature within the induction heating system is monitored at regular time intervals (e.g., 1 second, 1 minute, 5 minutes, and so on) using a temperature sensing device, such as a thermocouple, and the frequency of the alternating current is adjusted as needed in accordance with the detected temperature. For example, when the detected temperature is outside of a predetermined temperature range, the frequency of alternating current is changed so as to lower/increase the temperature within the induction system. Further, while the induction heating system is in a warming up or cooling down stage, the predetermined frequency range may change over time so as to regulate how rapidly the temperature is being changed within the induction heating system.

Also, the time required to sinter the powder bed into an individual work piece or substrate varies and generally depends on: the various characteristics of the induction heating system (such as the size, shape, and thickness of the susceptors and/or coils, a distance between susceptors and/or coils, and the like), the characteristics of the preformed powder (such as porosity or particle size), the desired characteristics of the work piece or substrate (such as porosity or strength), the rate of thermal loss from the induction heating system, and other variables. In some embodiments, to shorten the induction heating process, the induction heating system 200 is thermally insulated from the outside environment or assisted with conductive, convective, or radiational heating (or cooling). The thermal insulation is provided, for example, by wrapping the induction heating system 200 with thermal insulating fibers 250. By limiting the thermal loss during the induction heating process, the overall time required to sinter the cathode or anode powder into the individual work piece or substrate can be reduced.

Tests were performed to sinter preformed Ni powder into a freestanding cathode work piece having an approximate size of 51"×31." In particular, an induction heating system used for the tests was thermally insulated. The susceptors 220A and 220B comprised graphite plates, about $3/8$" to $1/2$" thick, and one of the graphite plates was raised above the other using $1/4$" ceramic bars. The lower graphite susceptor also served as the form or support for Ni powder. After applying alternating current for about 45 minutes, the powder bed was successfully sintered into an individual cathode work piece that could be released from the support with relative ease while still hot. In this test, the heating temperature of 825° C. was lower than a target temperature of 850° C. Experimental results have also confirmed that Ni-based work pieces or substrates sintered using the induction heating system 200 or 300 in the manner described above show comparable and better properties in porosity, pore size distribution, overall void volume, and uniformity of the porosity throughout the entire work piece than Ni-based work pieces produced using convection, conduction, or radiation heating methods, such as by using batch or a continuous kiln. Further, sintering the cathode or anode powder in the above-described manner advantageously lowers the capital costs associated with the manufacturing of the fuel cell system, improves consistency and repeatability, enhances productivity and product quality, and reduces maintenance costs, space usage, and energy consumption.

Returning now back to FIG. 1, after the cathode work piece or substrate has been formed by sintering and proceeding to a cooling step 125 in which the work piece or substrate is cooled using a cooling assembly or the like. An illustrative cooling assembly that may be used in step 125 is described in more detail below. After cooling, the method 100 may stop or proceed to step 130 in which a predetermined amount of electrolyte is distributed over the cathode work piece or substrate. In one embodiment, electrolyte powder is uniformly spread onto the surface of the cathode substrate. The amount of electrolyte powder distributed over the work piece is primarily determined by the size of the work piece and desired characteristics of the final cathode, the porosity, electrolyte fill level, strength, and/or washed porosity of the cathode electrode. After the distribution of the electrolyte powder is completed in step 130, the work piece or substrate is placed within an induction heating system in step 140 for heating the work piece or substrate so as to melt and wick the electrolyte into the porous body the work piece or substrate. In some embodiments, the induction heating system for melting and wicking the electrolyte into the work piece or substrate body has a similar construction to the induction heating system of FIG. 2. In other embodiments, the induction heating system 300 of FIG. 3 is used in step 140.

Figure 3:
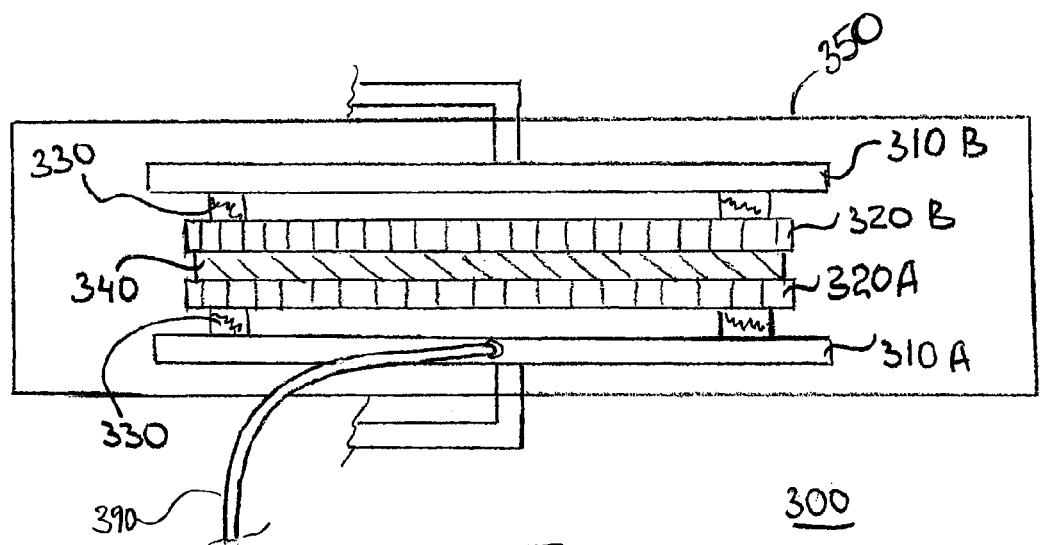
FIG. 3 shows an induction heating system for impregnating the electrode with electrolyte.

Referring to FIG. 3, in one embodiment, the induction heating system 300 includes a pair of flat coils 310A and 310B (discussed in greater detail below with respect to FIG. 4), a pair of susceptors 320A and 320B, and one or more ceramic bars 330. The coils 310A and 310B act as a primary transformer to which AC current of a predetermined frequency is supplied from an RF power supply to create a magnetic field between the coils 310A and 310B. The cathode or anode work piece or substrate with the distributed electrolyte powder is placed and sandwiched between the pair of susceptors 320A and 320B, which are placed between the coils 310A and 310B. To prevent direct contact between the coils 310A and 310B and the susceptors 320A and 320B respectively, one or more ceramic bars 330 are used, with the ceramic bars being positioned between the susceptors and adjacent coils, respectively. The size and placement of the ceramic bars 330 and the number of the ceramic bars 330 used in the induction heating system 300 varies depending on the size and configuration of the system 300. For example, in one embodiment, the ceramic bars 330 have a thickness of about $1/4$" so as to provide a gap of about $1/4$" between the susceptors 320 and respective coils 310.

The induction heating system 300 alternates the current to heat the susceptors 320, which in turn transfer the heat to the cathode or anode work piece or substrate 340 with the electrolyte powder distributed thereon and placed between the susceptors 320. In the embodiment shown, the work piece or substrate 340 is in direct contact with the susceptors 320. As in the induction heating system of FIG. 2, each of the susceptors 320 in this embodiment comprises a flat plate made from a thermally conducting material(s) that has a high thermal conductivity and relatively high electrical resistivity. Examples of such materials include, but are not limited to, are graphite, aluminum nitride, silicon carbide, boron carbide, cemented carbide, and the like. The shape of the susceptors 320 in this embodiment corresponds to the shape of the coils 310 and to the shape of the work piece or substrate 340. In some embodiments, sizes of the susceptors 320, coils 310, and the work piece or substrate are substantially the same, while in other embodiments their sizes may be different. For example, in one embodiment the size of the susceptors 320A and 320B may be smaller than the size of the respective coils 310A and 320B but larger than size of the work piece or substrate placed between the susceptors 320A and 320B for heating. Susceptors may be ½ inch to 5 inch bigger or smaller than the coil(s).

Use of the susceptors 320 in the induction system 300 improves efficiency of the induction heating process and ensures more even heat distribution and more uniform temperature distribution within the work piece or substrate 340. In addition, the susceptors 320 serve as carriers for the work piece or substrate 340, rapidly conduct heat to the electrolyte powder, causing the electrolyte powder to melt quickly, and apply pressure to the work piece during impregnation of the melted electrolyte into the body of the work piece or substrate. To ensure melting and subsequent wicking of the electrolyte into the work piece or substrate 340, the work piece or substrate is heated to at least 20° C. over the melting temperature. In some embodiments, the work piece or substrate 340 is heated to a temperature above 500° C., and in particular, to a temperature between 550° C. and 700° C. In some embodiments, the temperature generated by the induction heating system 300 is monitored and controlled using a controller and a temperature sensing device, such as a thermocouple 390, attached to one of the susceptors 310 or work piece/substrate. For example, the temperature can be controlled to 585° C. with a dwell time of about 5 minutes or to 585° C.+/−5° C.

In the illustrative embodiment of FIG. 3, the induction system 300 also includes a chamber 350, which provides an environment that facilitates the process of impregnating the work piece or substrate with the electrolyte. In some embodiments, the chamber 350 is used to create a nitrogen, a nitrogen-hydrogen atmosphere, or other protective atmosphere within the chamber so as to prevent the work piece material or substrate and graphite from oxidation or adhering during the induction heating process. For example, in Ni-based substrates, the nitrogen-hydrogen or other protective atmosphere protects the nickel from oxidation. The chamber 350 may further provide thermal insulation of the induction heating system 300, for example, by wrapping the induction heating system 300 with thermally insulating fiber. By limiting the thermal loss during the induction heating process, the overall time required to melt and wick the electrolyte into the porous body of work piece or substrate can be reduced.

Although, as shown in FIG. 3, the induction heating system 300 includes two susceptors 320, the number of susceptors used in the system may vary. For example, the induction heating system 300 may include no susceptors, one susceptor, two susceptors, three susceptors, and so on. Further, the frequency of the alternating current in the coils to induce the Eddy currents inside the susceptors 320A and 320B of the induction heating system 300 vary and is typically within a wide radio frequency range of 50 to 500 kHz. The specific frequency of the alternating current depends on the various characteristics of the particular induction heating system 300, such as the thickness of the susceptors, the type of the susceptor material, and the like, of the electrolyte powder, such as its conductivity and particle size, of the work piece or substrate, such as its thickness and porosity, of the desired temperature to be generated within the induction heating system, and so on. In general, the frequency for the alternating current is selected such that the thinner the susceptor and the greater its thermal conductivity, the higher will be the selected frequency.

Referring now back to FIG. 1, after the fuel cell cathode has been formed in the step 140 by using induction heating to melt and wick the electrolyte into the body of the porous work piece or substrate, the manufacturing method proceeds to step 150 in which the fuel cell cathode is cooled. In particular, in some embodiments the work piece or substrate 340 and the susceptors 320 that support the work piece are transported to a separate chamber for cooling, such as chamber 600 shown in FIG. 6.

Figure 6:
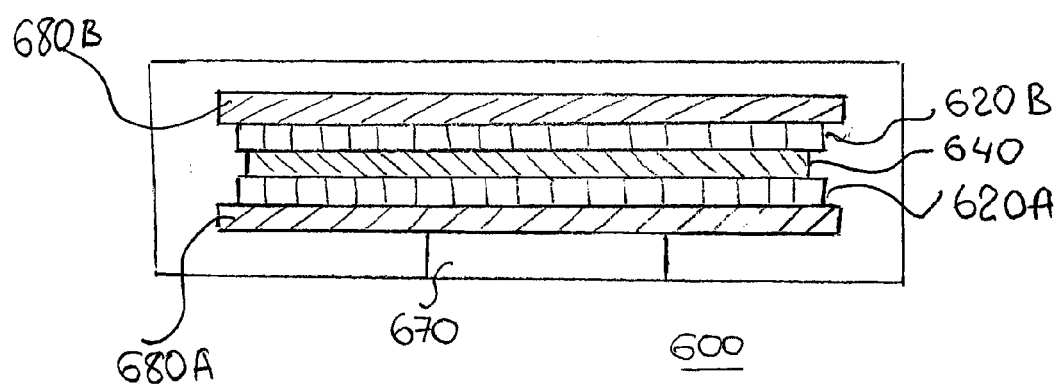
FIG. 6 shows a cooling system for use in manufacturing an electrode.

Referring now to FIG. 6, in some embodiments, one or more chilled, metal-based plates 680 (e.g., aluminum-based flat plates) or plates made from other high thermally conductive materials are used to provide cooling of the electrolyte-impregnated cathode. In particular, in the illustrative embodiment of FIG. 6, the electrode 640 remains supported by the susceptors 620 used during impregnation or by additional cooling materials or devices. In this way, the susceptors 620 or the additional cooling materials or devices serve as a support for the electrode during the cooling stage of the electrode manufacturing process and prevent the electrolyte filled body of the electrode from warping and cracking during freezing of the electrolyte.

In certain embodiments, one or more coils used for the induction heating is used in the cooling chamber instead of separate cooling or chilled plates. In such embodiments, the electrode 640 and/or the susceptors 620 are supported by the one or more coils, which are cooled using a cooling device or a cooling medium and which cool the electrode 640 directly or via the susceptors 620. For example, the induction coils typically have cooling fluid or medium flowing through them in order to keep them from overheating during induction heating. During the cooling stage, the cooling fluid or medium is used for cooling the electrode and/or the susceptors supported by, and in contact with, the coils.

As shown in FIG. 6, in order to cool the electrode 640, the combination of the electrode 640 and the susceptors 620 surrounding or sandwiching the electrode is placed on top of a chilled plate or coil 680A provided on a support 670 within the cooling chamber 600. Further, in this illustrative embodiment, another chilled plate or coil 680B may be placed on the top of the susceptor 620B. The chilled plates or coils 680A and 680B cool the susceptors 620A and 620B, respectively, which in turn cool the electrode disposed between the susceptors 620A and 620B.

Using one or more chilled plates or coils 680 for cooling of the electrolyte-impregnated electrode decreases the cooling time and increases the cooling rate. Such cooling also improves the production output and compactness and integrity of the system for manufacturing the electrode for the fuel cell. Further, using the susceptors 620 in the combination with the cooling plates or coils 680 ensures uniform cooling of the impregnated electrode, and thus, an improved quality of the final product. Although, FIG. 6 shows two chilled plates 680A and 680B, a single chilled plate or coil may be used instead during the cooling stage, e.g., the chilled plate or coil 680A. Moreover, a protective atmosphere may be required until part temperature is below the oxidizing temperature.

Referring now back to FIG. 1, in steps 125 and/or 150, other methods of cooling the sintered work piece or substrate and/or electrolyte-impregnated electrode may be used. For example, in some embodiments, the sintered work piece or substrate or the electrolyte-impregnated electrode remains in the induction heating system 300 of FIG. 3 for cooling, where cold water or other cooling liquid is circulated within the coils 310 to cool the susceptors 320. Yet, in other embodiments, cool air may be used to cool the susceptors 320 and the sintered work piece/substrate or the electrolyte-impregnated electrode 340. After the electrolyte-impregnated electrode has been cooled in step 150, it is ready for use in the fuel cell. In some embodiments, where the electrode is not impregnated with electrolyte, the sintered work piece or substrate, after cooling in step 125, is ready for use in the fuel cell. In yet other embodiments, hybrid cooling systems may be used where the convection, conduction or radiation cooling is used either alone or in combination with the chilled or cooled plate/coil cooling described above.

Figure 4:
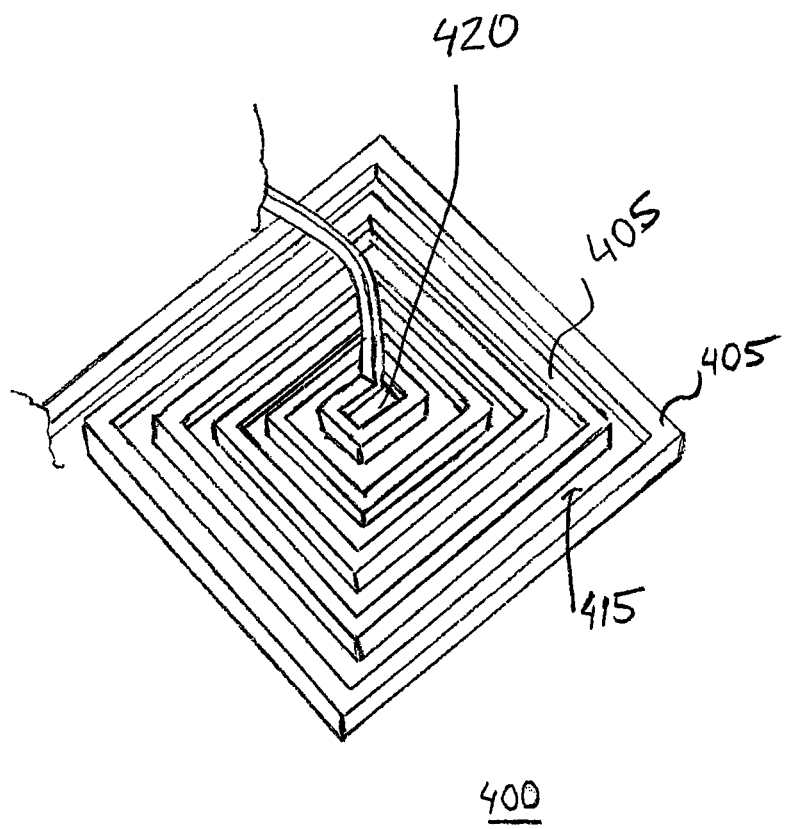
FIG. 4 shows a schematic view of a coil for use in the induction systems shown in FIGS. 2 and 3.

As described herein above with respect to FIGS. 2 and 3, the induction heating systems comprise one or more coils for heating the susceptors. FIG. 4 shows a schematic view of a coil 400 suitable for use in the induction heating systems of FIGS. 2 and 3. As discussed above, two symmetrical coils 400 are employed by each induction heating system with the powder bed or work piece/substrate, or the powder bed or work piece/substrate sandwiched between the susceptors, being placed between the coils 400. Generally, the particular design of the coils employed by the induction heating system, the shape, and the distance between the coils and respective susceptors and the thickness of the susceptors will define how uniformly the heat will be distributed within a powder bed or work piece/substrate placed between the coils 400.

FIG. 4 shows an illustrative example of the coil 400 that is flat, or substantially flat, and has multiple symmetrical turns 405. In the coil 400 of FIG. 4, the gaps or spaces 415 between adjacent turns 405 are substantially the same throughout the coil 400. In some embodiments, the spaces 415 between the adjacent turns may vary, for example, by becoming larger (or smaller) in the direction away from a center 420 of the coil 400. Although the coil 400 is shown to have a square shape, the shape and size of the coil 400 may be varied depending on the desired shape and size of the cathode to be manufactured and to control temperature uniformity. For example, if the electrode to be manufactured has a rectangular shape and a size of 50"×28", in one embodiment, the coils 400 employed in the induction heating systems for sintering and impregnating such an electrode also may have a rectangular shape with the outer-most coil turn being slightly larger than the size of the cathode, e.g., 52"×31".

Flat coils, such as the coil 400 shown in FIG. 4, have a so-called "dead-spot" located in the center 420 of the coil 400. In the "dead-spot," Eddy currents are typically cancelled, and thus provide no heat source in that area. Consequently, localized temperature non-uniformity may be caused within an object placed between the coils 400. In order to reduce the temperature deficit in the "dead-spot" area to an acceptable level, in some embodiments, the powder bed or work piece/substrate is placed between two susceptors prior to being placed between the coils. The susceptors, thus, provide more uniform temperature distribution within the powder bed or work piece/substrate by relaying the heat via thermal conduction.

Figure 5:
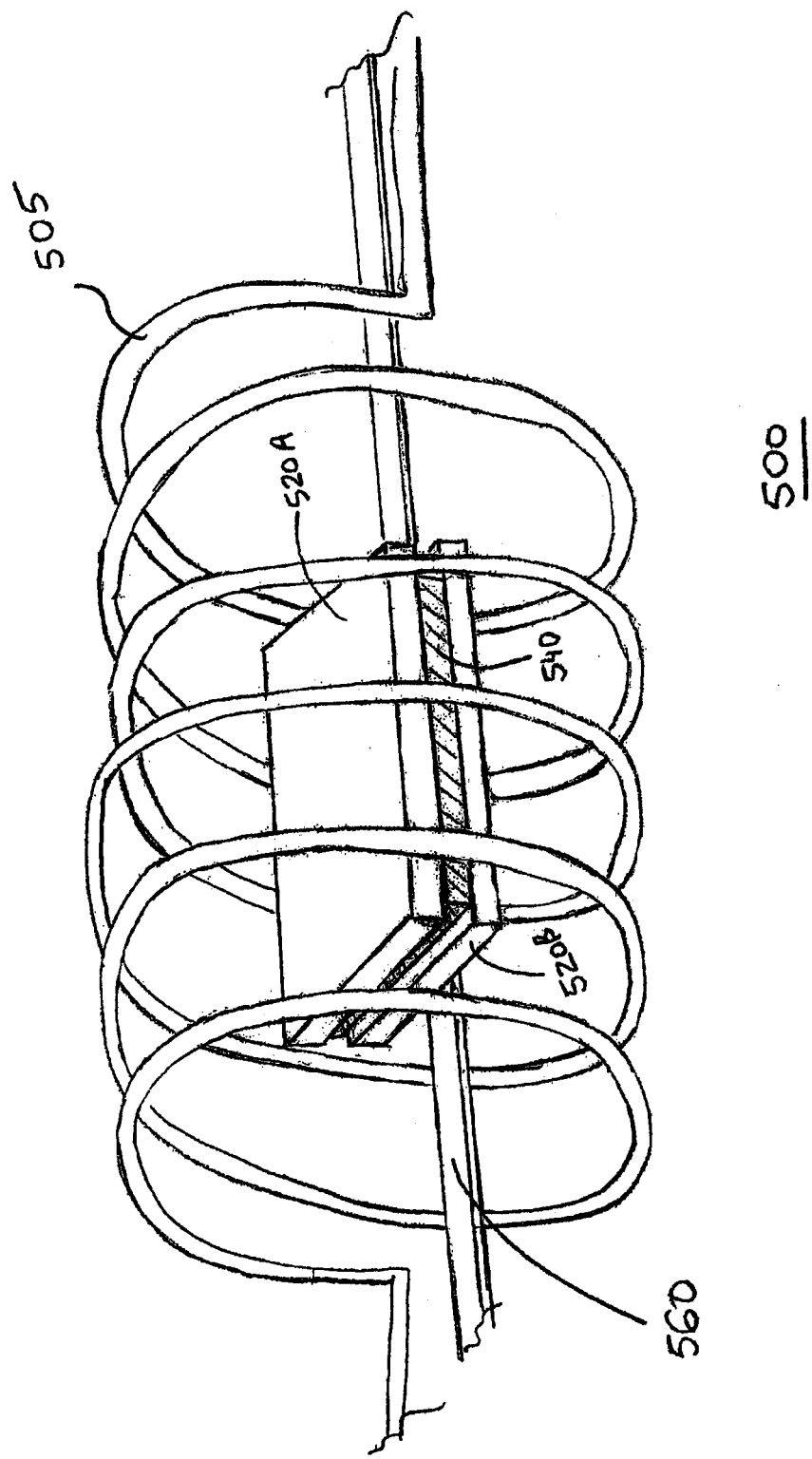
FIG. 5 shows another embodiment of the induction heating system for use in manufacturing an electrode.

In other embodiments, the induction heating systems employed in manufacturing cathode or anode electrodes for a fuel cell use a different type of coil for generating the induction heating. For example, FIG. 5 shows an induction heating system 500, which, instead of a pair of flat coils, employs an oval multi-turn solenoid coil 505. The induction heating system 500 applies the induction heating to the powder bed or work piece/substrate and/or susceptors that move through the multi-turn solenoid coil 505. For example, as shown in FIG. 5, a powder bed or work piece/substrate 540, in combination with and sandwiched between the susceptors 520A and 520B, is moved along through the coil 505 from one end to another end of the coil 505 using a driving or pulling mechanism 560, such a conveyor.

In the induction heating system 500, AC current of a predetermined frequency is supplied from an RF power supply to create a magnetic field within the coil 505. When an object to be heated, such as the powder bed or work piece/substrate 540 and the susceptors 520, enters into the magnetic field created within the coil 505, a circulating current (Eddy current) is induced within the body of the object. As the object moves through the coil and the current flows against the electrical resistance of the body of the object, precise and localized heat is generated without the direct contact between the body of the object and the coils. Although not shown in FIG. 5, ceramic members, such as ceramic bars, may be used to prevent direct contact between one or more of the susceptors 520 and the coil.

Compared to the flat coils of FIG. 4, the oval coils, such as the coil 505 of FIG. 5, have less pronounced edge and end effect and are less sensitive to the powder bed, work piece/substrate and coil geometry and position variations. Accordingly, the oval coil 505 generating the induction heating during the electrode manufacturing process may provide improved overall temperature uniformity within the powder bed or work piece/substrate and repeatable temperature distribution. Furthermore, the oval coils, such as the coil 505 shown FIG. 5, have improved energy efficiency, and thus enabling further improvements in the overall efficiency of the system for manufacturing the fuel cell electrode.

In some embodiments, the induction heating system 500 is employed during the process of sintering cathode or anode electrode material into a sintered work piece or substrate (as described above with respect to step 120 of the method 100 shown in FIG. 1) as well as during the process of impregnating the work piece or substrate with electrolyte to form the electrolyte impregnated cathode or anode electrode (as described above with respect to step 140 of the method 100 shown in FIG. 1). However, in other embodiments, the induction heating system 500 is employed for only one of the sintering of the electrode material and the impregnating the work piece/substrate with electrolyte, while a different induction heating system, such as the system shown in FIG. 2 or 3, or another conventional heating method and system is used for the other of the sintering of the electrode material and the impregnating the work piece/substrate with electrolyte. Such conventional heating methods and systems include, but are not limited to, convection heating, conduction heating and/or radiation heating.

Similarly, hybrid electrode manufacturing systems which employ induction heating for one of the sintering and impregnating and another type of heating for the other of sintering and impregnating of the electrode may be used in some embodiments of the invention. For example, in some embodiments, an induction heating assembly, such as the assembly shown in FIG. 2, 3 or 5, is used for sintering of the anode or cathode powder bed to form an individual work piece or substrate, while a different heating method is used for impregnating the work piece/substrate with electrolyte. In other embodiments, the sintering of the powder bed is performed using a heating method other than an induction heating method, while the impregnating of the work piece/substrate with electrolyte is performed using the induction heating assembly, such as the assembly shown in FIG. 2, 3 or 5. The other heating methods used in such hybrid systems include, but are not limited to, convection, conduction and/or radiation. Moreover, induction heating systems employing different variations of the system for different stages of the manufacturing process may be used. For example, in some embodiments, the sintering of the powder bed is performed using one variation of the induction heating system, such as one of the variations shown in FIG. 2, 3 or 5, while the impregnating of the work piece/substrate is performed another variation of the induction heating system, such as another one of the variations shown in FIG. 2, 3 or 5. Moreover, hybrid electrode manufacturing systems may employ two different types of heating, including induction heating, for at least one of sintering and impregnating the electrode. For example, the system may simultaneously use induction heating and another heating method, such as convection, conduction or radiation, for sintering an electrode, and/or for impregnating the electrode with electrolyte. It is understood that variations of the heating method combinations may be used for sintering and/or impregnating the electrode.

Figure 7:
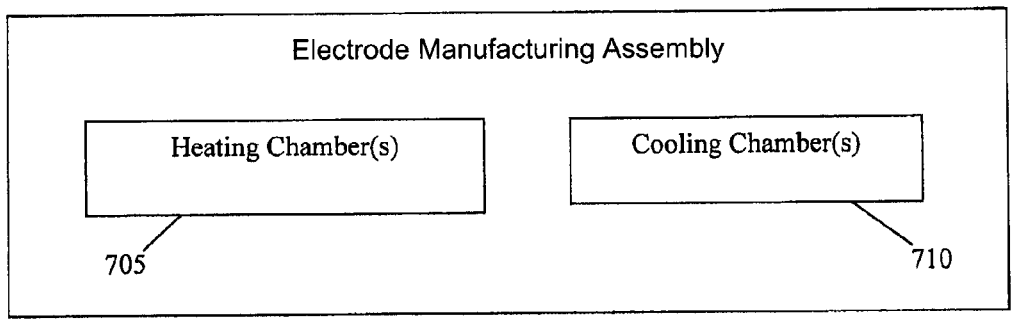
FIG. 7 shows a schematic view of a assembly for manufacturing an electrode for a fuel cell.

FIG. 7 schematically shows a fuel cell electrode manufacturing assembly 700 which includes one or more heating chambers 705 and one or more cooling chambers 710. Each heating chamber 705 includes a heating system, such as the induction heating system discussed above with respect to FIGS. 2, 3, and 5, and each cooling chamber 710 includes a cooling system, such as the cooling system discussed above with respect to FIG. 6 and step 150 of FIG. 1. In some embodiments, the heating chamber(s) and the cooling chamber(s) 710 constitute one chamber, such as when the cooling is performed using the induction coils, or are arranged within the electrode manufacturing assembly in the order that facilitates consecutive execution of the processes in manufacturing the cathode or anode electrode for the fuel cell, such as a conveyer-like arrangement. In such embodiments a electrode work piece/substrate is moved sequentially from one chamber to another until a final cathode or anode electrode is formed.

For example, if an electrode is manufactured using the method 100 discussed above with respect to FIG. 1, in some embodiments, the electrode manufacturing assembly 700 includes three chambers, a first heating chamber 705$_1$ for sintering the powder material (step 120 of FIG. 1), a second heating chamber 705$_2$ for impregnating the work piece or substrate with electrolyte (step 140 of FIG. 1), and one or more cooling chambers 710 for cooling the sintered work piece/substrate and/or for cooling the impregnated electrode, wherein the work piece/substrate is moved from the first heating chamber, to the second heating chamber, and then to the cooling chamber. In some embodiments, the first and second heating chambers use the same technology, e.g., both use flat coils, both use oval coils, and so on. In other embodiments, the first and second heating chambers use different technologies, including but are not limited to induction heating using flat or oval coils, gas furnace heating, electric furnace heating, microwave heating, and the like. Further, in some embodiments, the same heating chamber 705 is used for both sintering the powder bed and impregnating the work piece or substrate with electrolyte, such that the same induction heating system is used for both the sintering and impregnation steps of the manufacturing process. In such embodiments, conditions within the heating chamber (e.g., temperature, environment, susceptors used, and the like) are changed or adjusted depending on the particular process (sintering or impregnating) being performed within the heating chamber.

Further, if the individual work piece or substrate is to be cooled prior to being impregnated with electrolyte, an additional cooling chamber may be included into the cathode manufacturing assembly 700. Alternatively, the same cooling chamber may be used for cooling the work piece or substrate prior to being impregnated with electrolyte and after being impregnated with electrolyte. Thus, in such embodiments, prior to impregnating the work piece/substrate with electrolyte, the work piece/substrate is provided to the cooling chamber for cooling, or is subjected to cooling, before being heated in the induction heating system used for impregnating the work piece/substrate.

Although not shown, one or more controllers, including a processor, may be used for controlling the sintering, impregnation and cooling operations of the electrode manufacturing method described above. In the induction heating systems that include one or more temperature sensing devices, the controller receives the temperature readings from the temperature sensing device(s), determines whether or not the temperature in the induction heating system is within the predetermined range, and based on this determination, controls the operation of the induction heating system. That is, if the controller determines that the temperature in the induction heating system is outside of the predetermined range, the controller controls the induction heating system so as to adjust the alternating current frequency in order to increase or decrease the amount of heating until the temperature is within the predetermined range. The controller also controls the heating time period by the induction heating system based on the sintering and/or impregnation requirements.

In some embodiments, the controller receives one or more inputs from an operator or a user, such as the characteristics of the powder bed or work piece/substrate, the characteristics (e.g. thickness) of the susceptors and other inputs, and determines the predetermined temperature and/or heating time period required for sintering the powder bed and/or impregnating the work piece/substrate. In some embodiments, the one or more inputs received by the controller from the operator or user may include the predetermined temperature range and/or the heating time period. In such embodiments, the controller controls the induction heating system based on these user inputs and the temperature readings from the temperature sensing device(s).

In some embodiments, one or more controllers also control the cooling process in the cooling chambers. For example, in the embodiments in which temperature sensing device(s) are used in the cooling chamber, the controller receives temperature readings from the temperature sensing device(s) and determines whether or not the rate of cooling of the work piece/substrate is within a predetermined range so as to prevent cracking, warping or adhering of the work piece/substrate to its support and whether the work piece/substrate has been sufficiently cooled, e.g. whether the work piece has been cooled to a predetermined temperature. In some embodiments, if the controller determines that the rate of cooling is outside of the predetermined range, the controller controls the cooling system to adjust the cooling rate. In some embodiments, when the controller determines that the work piece/substrate has been sufficiently cooled, the controller provides a notification to the operator or user that the cooling has been completed. In other embodiments, the controller, upon determining that the cooling has been completed, controls the electrode manufacturing process so that the work piece/substrate is removed from the cooling chamber and, if needed, conveyed to the next chamber, e.g. induction heating system.

The controller described above may be used in the induction heating systems of FIGS. 2, 3 and 5 and/or in the cooling systems of FIG. 6. Moreover, the controller may be used to control the operation of the entire electrode manufacturing assembly of FIG. 7, or a portion thereof.

Figure 8:
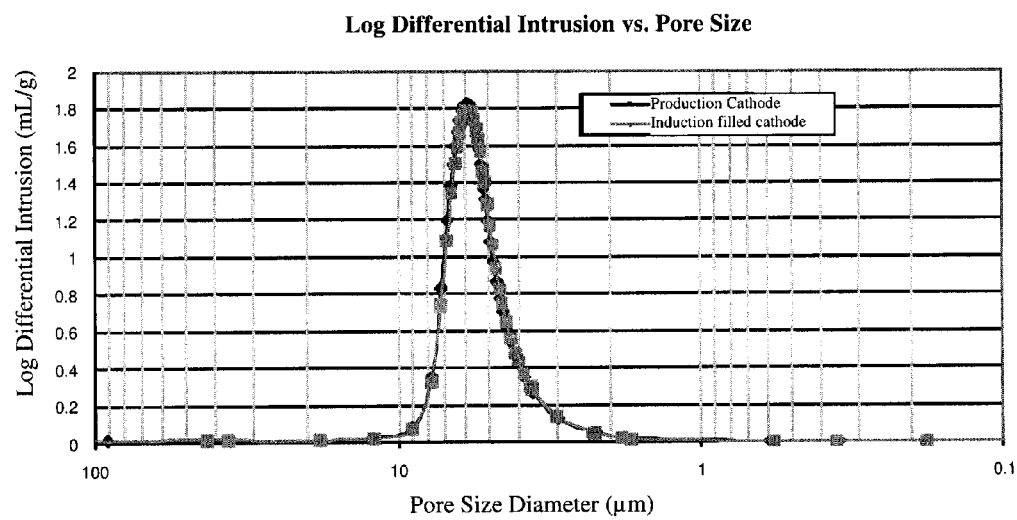
FIG. 8 shows a graph of pore distribution in cathode electrodes sintered and impregnated with electrolyte using an electric furnace and the induction heating system.

FIG. 8 shows a graph of pore size distributions in cathodes impregnated with electrolyte using an electric furnace and an induction heating system, respectively. The X-axis in FIG. 8 represents log differential intrusion in milliliters per grams, while the Y-axis represents the pore size. As shown in FIG. 8, no significant differences were observed in pore distributions of cathodes in which melting and wicking of electrolyte was achieved using an electric furnace and cathodes in which melting and wicking of electrolyte was achieved using induction heating. Therefore, these test results confirm that cathode electrodes manufactured using induction heating have at least the same pore structures and strength as those manufactured using electric heating and are visually and dimensionally similar to those manufactured using electric heating. Moreover, porosity, washed porosity, pore size distribution, fill level, void volume, visual, dimensional, and strength characteristics of the cathodes manufactured using induction heating were at least the same or better than of the cathodes manufactured using electric heating.

In all cases it is understood that the above-described arrangements are merely illustrative of the many possible specific embodiments, which represent applications of the present invention. Numerous and varied other arrangements can be readily devised in accordance with the principles of the present invention without departing from the spirit and the scope of the invention.

We claim:

1. A method of manufacturing an electrolyte impregnated electrode for a fuel cell, the method comprising:
   forming a powder bed from a predetermined powder;
   sintering the powder bed at a first predetermined temperature to form an electrode;
   distributing an electrolyte powder on a surface of the electrode formed in the sintering step; and
   impregnating the electrode with electrolyte by heating the electrode with the electrolyte powder thereon to a second predetermined temperature while applying pressure to the electrode with the electrolyte powder thereon so as to melt and wick the electrolyte into the electrode, thereby forming the electrolyte impregnated electrode for the fuel cell; wherein
   at least one of the sintering and impregnating is performed by applying induction heating to at least one of the powder bed and the electrode,
   the induction heating is applied by an induction heating system including at least one coil and at least one susceptor,
   the at least one susceptor supports the at least one of the powder bed and the electrode and conducts heat to the at least one of the powder bed and the electrode, and
   the at least one coil comprises one of a multi-turn coil with an oval cross-section or a pair of flat coils.

2. The method of claim 1, wherein the induction heating system comprises a pair of flat coils and a pair of susceptors, and the applying induction heating to the at least one of the powder bed and the electrode comprises:
   disposing one of the powder bed and the electrode between the pair of susceptors and disposing the pair of susceptors between the coils; and
   supplying alternating current of a predetermined frequency to the coils for a predetermined time period.

3. The method of claim 2, wherein the applying induction heating further comprises: monitoring temperature in the induction heating system generated by the coils; and adjusting the frequency of the alternating current supplied to the coils if the temperature is outside a predetermined range.

4. The method of claim 3, wherein the predetermined frequency is between 50 kHz and 500 kHz.

5. The method of claim 1, wherein the induction heating system comprises a multi-turn coil with an oval cross-section and a pair of susceptors, and the applying induction heating to the at least one of the powder bed and the electrode comprises:
   disposing one of the powder bed and the electrode between the pair of susceptors;
   conveying the susceptors with one of the powder bed and the electrode through an oval opening in the multi-turn coil while supplying an alternating current of a predetermined frequency to the multi-turn coil so as to maintain a temperature within the induction heating system in a predetermined temperature range.

6. The method of claim 1, further comprising providing at least one of a nitrogen-based atmosphere and a thermally insulated environment while applying induction heating.

7. The method of claim 1, further comprising providing one or more ceramic members between the at least one susceptor and at least one coil so as to prevent direct contact between the at least one susceptor and the at least one coil.

8. The method of claim 1, wherein the first predetermined temperature is between 750 and 950 degrees C. and the second predetermined temperature is at least 20 degrees C. above the melting point of the electrolyte powder.

9. The method of claim 1, wherein the at least one susceptor comprises one of: a graphite plate, an aluminum nitride plate, a silicon carbide plate, a boron carbide plate and a cemented carbide plate.

10. The method of claim 1, wherein:
   the sintering of the powder bed comprises applying induction heating to the powder bed;
   the powder bed is formed in a recess in a first susceptor of the induction heating system and a second susceptor is provided in a spaced relationship relative to the first susceptor and the powder bed;
   the applying of induction heating to the powder bed comprises one of:
   (a) disposing the first and second susceptors with the powder bed formed in the first susceptor between first and second flat coils, and supplying alternating current of a predetermined frequency to the first and second flat coils for a predetermined time period; and (b) conveying the first and second susceptors with the powder bed formed in the first susceptor through the multi-turn coil while supplying an alternating current of a predetermined frequency to the multi-turn coil.

11. The method of claim 1, further comprising:

cooling the electrolyte impregnated electrode after impregnating the electrode with electrolyte, the cooling comprising contacting the at least one susceptor supporting the electrolyte impregnated electrode with one or more cooling members.

12. The method of claim 1, wherein:

the electrode is one of a cathode electrode and an anode electrode; and the predetermined powder comprises one of a nickel powder, a nickel-based powder and a magnetic powder.

13. The method of claim 1, wherein the applying pressure to the electrode with the electrolyte powder thereon comprises applying pressure to the electrode with the electrolyte powder thereon with the at least one susceptor.

\* \* \* \* \*